US011858137B2

(12) United States Patent
Modzel (10) Patent No.: US 11,858,137 B2
(45) Date of Patent: Jan. 2, 2024

(54) MECHANICAL GRASPING END EFFECTOR WITH HORIZONTAL AND VERTICAL MOVEMENT

(71) Applicant: Ford Global Technologies, LLC, Dearborn, MI (US)

(72) Inventor: John Modzel, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 465 days.

(21) Appl. No.: 17/122,947

(22) Filed: Dec. 15, 2020

(65) Prior Publication Data
US 2022/0184800 A1 Jun. 16, 2022

(51) Int. Cl.
*B25J 9/10* (2006.01)
*B25J 15/00* (2006.01)
*F16H 19/00* (2006.01)

(52) U.S. Cl.
CPC ........... *B25J 9/109* (2013.01); *B25J 15/0028* (2013.01); *F16H 19/001* (2013.01); *F16H 2019/008* (2013.01)

(58) Field of Classification Search
CPC .... B25J 9/109; B25J 15/0028; B25J 15/0033; B25J 15/0052; B25J 15/022; B25J 15/0213; B25J 15/0206; B25J 15/00; F16H 19/001; F16H 2019/008
See application file for complete search history.

(56) References Cited

U.S. PATENT DOCUMENTS

| | | | | |
|---|---|---|---|---|
| 3,306,646 A * | 2/1967 | Flora, Jr. | ................ | B66C 1/427 294/81.61 |
| 5,024,575 A * | 6/1991 | Anderson | .............. | B65G 47/90 414/737 |
| 5,108,140 A | 4/1992 | Bartholet | | |
| 7,455,338 B2 * | 11/2008 | Jenney | ...................... | B66C 1/30 294/81.4 |
| 8,414,042 B2 * | 4/2013 | Landes | .................. | B65G 47/90 294/67.31 |
| 10,995,876 B2 * | 5/2021 | Sze | .......................... | B25J 15/02 |

FOREIGN PATENT DOCUMENTS

| | | |
|---|---|---|
| CN | 2672015 | 1/2005 |
| CN | 107650140 | 2/2018 |
| CN | 108100659 | 6/2018 |

\* cited by examiner

*Primary Examiner* — Stephen A Vu
(74) *Attorney, Agent, or Firm* — Burris Law, PLLC (57) ABSTRACT

A mechanical device for grasping an object without a power source includes a receiver and at least one grabber assembly secured to the receiver. The grabber assembly includes first and second arms with proximal end portions and distal end portions, hooks disposed at the distal end portions, and a mechanical linkage disposed near the proximal end portion of the first arm and the second arm. The mechanical linkage kinematically couples the first arm to the second arm. Displacement of the first arm or the second arm against the object causes movement of the mechanical linkage and thus movement of the second arm or first arm, respectively.

20 Claims, 13 Drawing Sheets

MECHANICAL GRASPING END EFFECTOR WITH HORIZONTAL AND VERTICAL MOVEMENT

FIELD

The present disclosure relates to robotic systems and exoskeleton suits with end effectors, and more particularly to end effectors that are configured to grasp and move objects.

BACKGROUND

The statements in this section merely provide background information related to the present disclosure and may not constitute prior art.

Industrial robots have been used for a variety of manufacturing operations, including by way of example, welding, placement of parts for subsequent fabrication or assembly operations, and moving parts from one location to another such as retrieving parts from a storage location and moving them to an assembly station. These industrial robots include end effectors, which are essentially the hands of the robot. In many applications, the end effectors are configured as grippers, which grasp a part and move the part to a different location or manipulate the position of the part for manufacturing operations.

Recently, exoskeleton suits have been developed, which are wearable mobile robotic accessories powered by electric motors, pneumatics or hydraulics, or other systems to allow a user to have increased strength and endurance when performing various operations, such as industrial manufacturing operations. These exoskeleton suits also have end effectors, which come in a variety of configurations depending on the particular manufacturing operation. However, exoskeleton suits are often heavy and cumbersome, as power is required for their operation. In some environments, power may not be available, or power from a battery may be dissipated before completion of the manufacturing task using the exoskeleton suit.

These issues related to exoskeleton suits, among other issues related to robotic end effectors, are addressed by the present disclosure.

SUMMARY

This section provides a general summary of the disclosure and is not a comprehensive disclosure of its full scope or all of its features.

In one form, a mechanical device for grasping an object without a power source is provided that includes a receiver, at least one grabber assembly secured to the receiver, the at least one grabber assembly comprising a first arm comprising a proximal end portion and a distal end portion, and a hook disposed at the distal end portion. A second arm comprising a proximal end portion and a distal end portion, and a hook disposed at the distal end portion. A mechanical linkage is disposed near the proximal end portion of the first arm and the second arm, the mechanical linkage kinematically coupling the first arm to the second arm. Displacement of the first arm or the second arm against the object causes movement of the mechanical linkage and thus movement of the second arm or first arm, respectively.

In one variation of the mechanical device, the mechanical linkage comprises a hub assembly comprising a shaft rotationally coupled to opposed bevel gears, the shaft comprising a set of offset apertures. The first arm extends through one of the offset apertures of the shaft, the first arm further comprising a first bevel gear disposed at the proximal end portion and engaging one of the opposed bevel gears. The second arm extends through another one of the offset apertures, the second arm further comprising a second bevel gear disposed at the proximal end portion and engaging another one of the opposed bevel gears. Movement of the mechanical linkage comprises rotation of the shaft.

In variations of this bevel gear design, which may be employed individually or in any combination: the opposed bevel gears are fixed; at least one shield extends between the opposed bevel gears, wherein the shield covers at least a portion of each opposed bevel gear; each of the hooks comprise are integrally formed with each of the first and second arm; each of the hooks of the first and second arms extend in opposite directions; each of the hooks of the first and second arms extend in the same direction; a stop is configured to limit motion of at least one of the first arm and the second arm; and the stop comprises a cage surrounding the first arm and the second arm.

In another design configuration, the mechanical linkage comprises a central frame, each of the first arm and second arm extending through the central frame, and each of the first arm and second arm comprising upper and lower links. A pair of upper opposed receivers each comprise an arm with end portions, each end portion being pivotally coupled to the upper links of the first arm and the second arm. A pair of lower opposed receivers each comprise an arm with end portions, each end portion being pivotally coupled to the lower links of the first arm and the second arm. The displacement of the first arm or the second arm against the object causes rotation of the lower opposed receivers and the upper opposed receivers and thus movement of the second arm or first arm, respectively.

In variations of this second configuration with links, which may be employed individually or in any combination: a stop is configured to limit motion of at least one of the first arm and the second arm; the stop comprises a cage secured to the central frame; and each of the pair of upper opposed receivers and lower opposed receivers comprises a slot, each of the upper and lower links being disposed within a respective slot.

In yet another form of the present disclosure, a mechanical device for grasping an object without a power source comprises a receiver and opposed grabber assemblies secured to outboard portions of the receiver. Each grabber assembly comprises a first arm comprising a proximal end portion and a distal end portion, and a hook disposed at the distal end portion. A second arm comprises a proximal end portion and a distal end portion, and a hook disposed at the distal end portion. A mechanical linkage is disposed near the proximal end portion of the first arm and the second arm, the mechanical linkage kinematically coupling the first arm and the second arm. Displacement of the first arm or the second arm against the object causes movement of the mechanical linkage and thus movement of the second arm or first arm, respectively.

In one variation of this design with opposed grabber assemblies, the mechanical linkage comprises a hub assembly comprising a shaft rotationally coupled to opposed bevel gears, the shaft comprising a set of offset apertures. The first arm extends through one of the offset apertures of the hub, the first arm further comprising a first bevel gear disposed at the proximal end portion and engaging one of the opposed bevel gears. The second arm extends through another one of the offset apertures, the second arm further comprising a second bevel gear disposed at the proximal end portion and engaging another one of the opposed bevel gears. Movement of the mechanical linkage comprises rotation of the shaft.

In variations of this design with opposed grabber assemblies, which may be employed individually or in any combination: each of the hooks of the first and second arms extend in opposite directions; each of the hooks of the first and second arms extend in the same direction; a stop is configured to limit motion of at least one of the first arm and the second arm; and the stop comprises a cage surrounding the first arm and the second arm.

In yet another form of the present disclosure, a method of grasping an object without a power source comprises moving a mechanical device, the mechanical device comprising a first arm comprising a proximal end portion and a distal end portion, and a hook disposed at the distal end portion, a second arm comprising a proximal end portion and a distal end portion, and a hook disposed at the distal end portion, and a mechanical linkage disposed near the proximal end portion of the first arm and the second arm, wherein the mechanical linkage kinematically couples the first arm and the second arm. Moving the device comprises engaging the first arm or the second arm against the object, wherein the object displaces the arm being engaged with the object, which causes movement of the mechanical linkage and the other arm.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
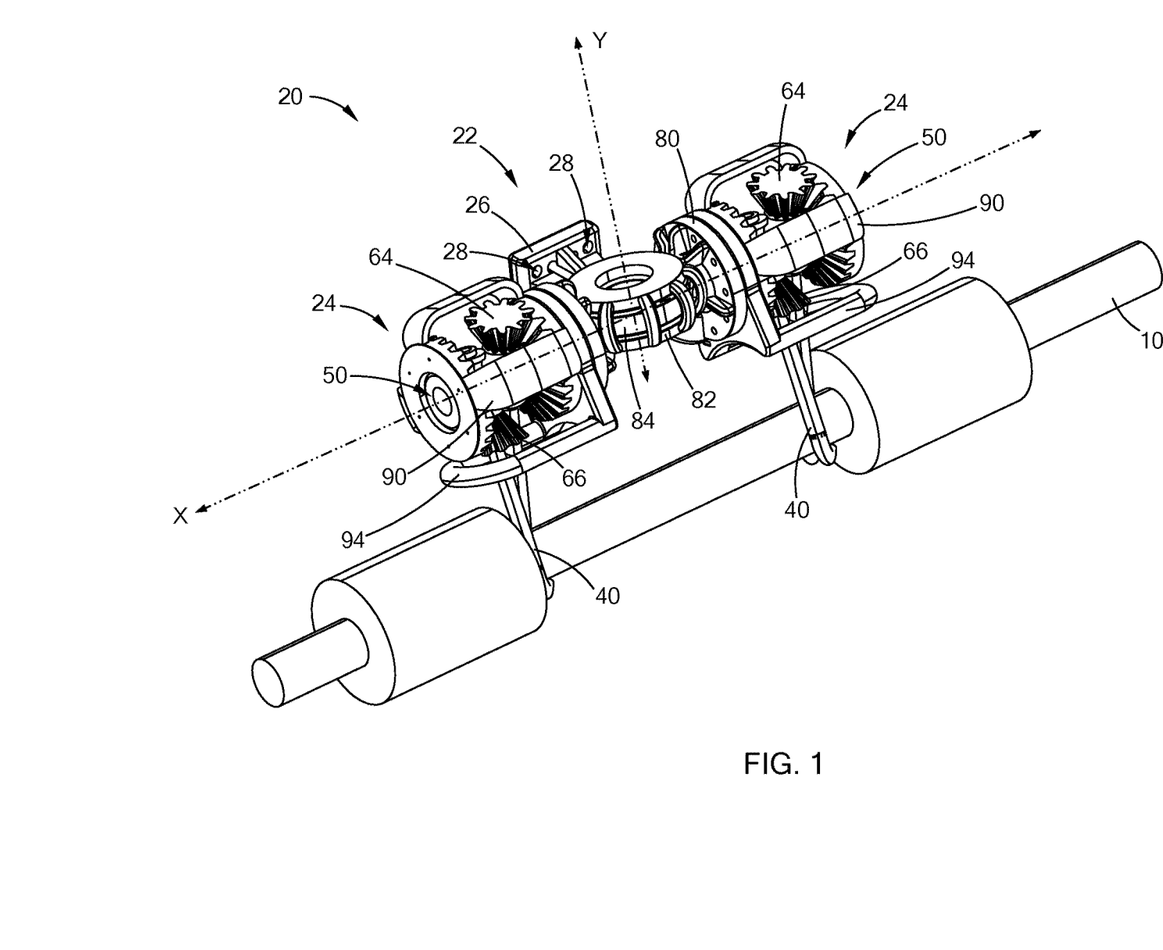
FIG. 1 is a perspective view of a device for grasping an object, shown grasping the object, and constructed according to the teachings of the present disclosure.
Figure 2A:
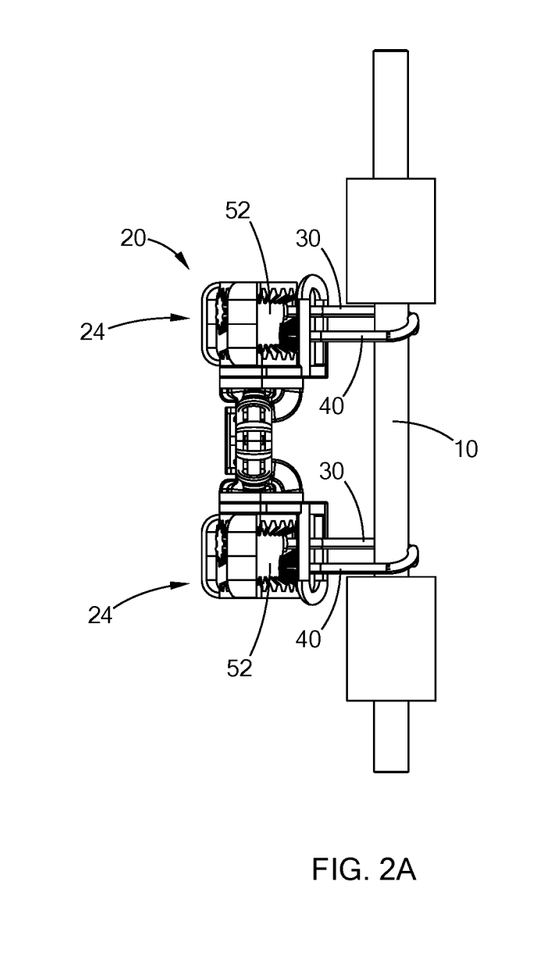
FIG. 2A is a side view of the device and the object of FIG. 1.
Figure 2B:
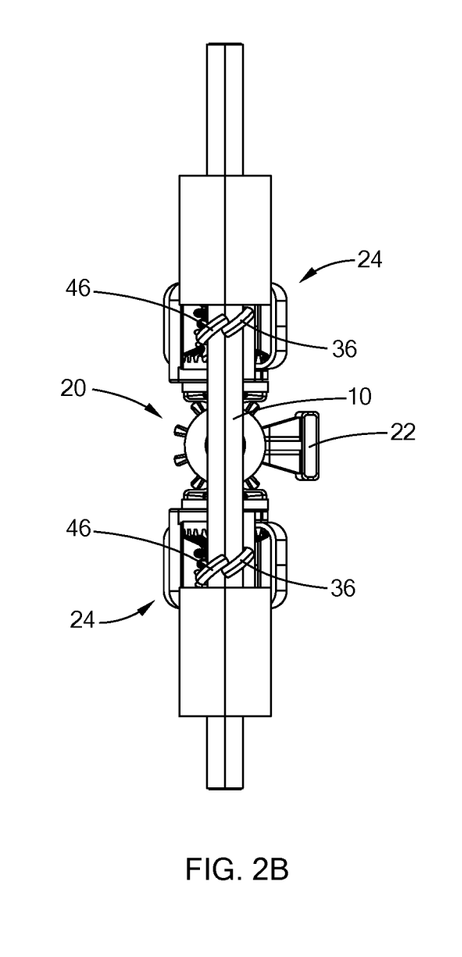
FIG. 2B is a bottom view of the device and the object of FIG. 1.
Figure 3:
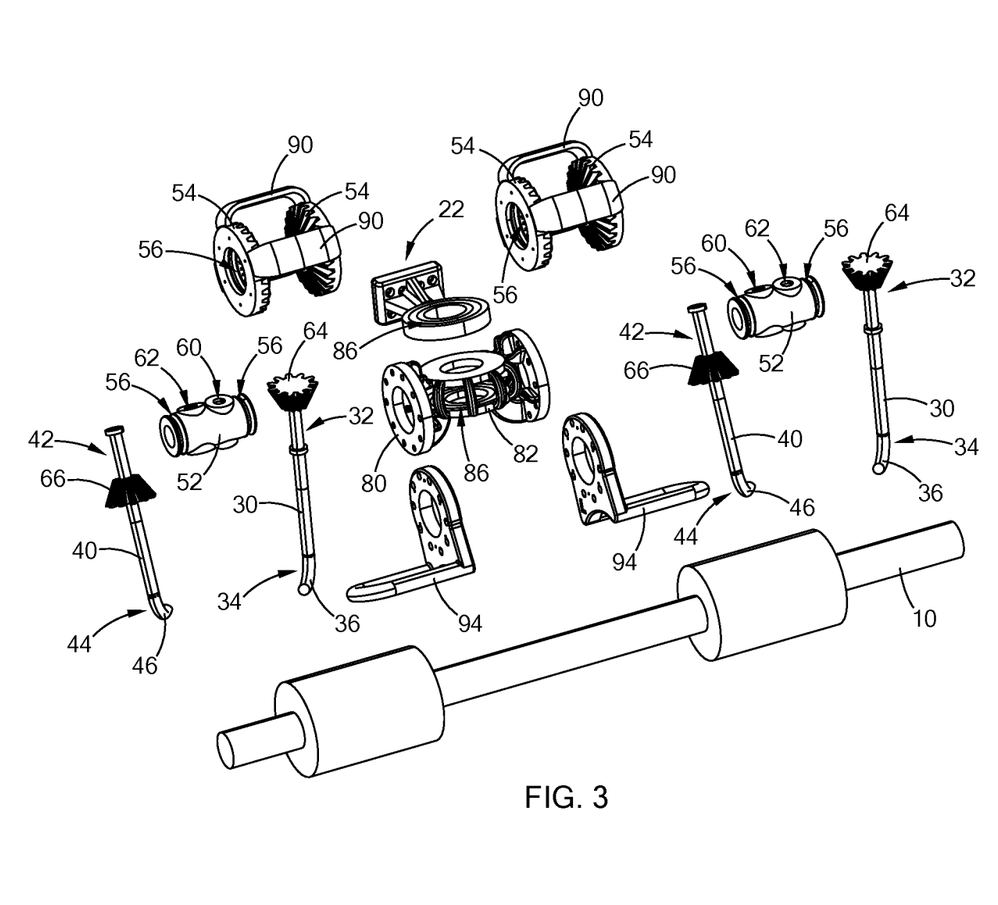
FIG. 3 is an exploded view of the device of FIG. 1.

Referring to FIGS. 1-3, a mechanical device for grasping an object without a power source (e.g., electricity, hydraulics, pneumatics) is illustrated and generally indicated by reference numeral 20. The mechanical device comprises a receiver 22 and opposed grabber assemblies 24. The receiver 22 is configured to be attached to an arm or component of an exoskeleton suit, or another robotic/automated mechanism (not shown). Accordingly, the receiver 22 in this form includes a platform 26 having a plurality of holes/openings 28 that receive bolts (not shown) to secure the receiver 22 to the arm/component of an exoskeleton suit or other robotic/automated mechanism.

The opposed grabber assemblies 24 are secured to outboard portions of the receiver 22 and are arranged to grasp an object such as a shaft 10. While two (2) opposed grabber assemblies are shown, it should be understood that the teachings of the present disclosure may be applied to at least one grabber assembly (one form of which is described in greater detail below) or more than two (2) grabber assemblies as illustrated herein. Further, the grabber assemblies 24 may be arranged in a variety of positions relative to the receiver 22, and thus the opposed grabber assemblies 24 as illustrated and described herein should not be construed as limiting the scope of the present disclosure. In yet another variation, the receiver 22 is an optional component as a grabber assembly 24 may be directly secured to arm/component of an exoskeleton suit or other robotic/automated mechanism.

As best shown in FIG. 3, each of the grabber assemblies 24 comprises a first arm 30 having a proximal end portion 32, a distal end portion 34, and a hook 36 disposed at the distal end portion 34. Similarly, a second arm 40 comprises a proximal end portion 42, a distal end portion 44, and a hook 46 disposed at the distal end portion 44. As shown, each of the hooks 36/46 are integrally formed with each of the first and second arm 30/40. In this form, each of the hooks 36/46 extend in opposite directions (best shown in FIG. 2B) to facilitate grasping an object such as the shaft 10. However, it should be understood that the hooks 36/46 may extend in the same direction, which would be beneficial in applications where the mechanical device 20 is used to grasp a wheel and the hooks 36/38 extend through spokes or lug nut holes in the wheel (not shown). Additionally, the hooks 36/38 may take on any geometric form or have additional functionality (e.g., magnets) while remaining within the scope of the present disclosure.

Figure 4:
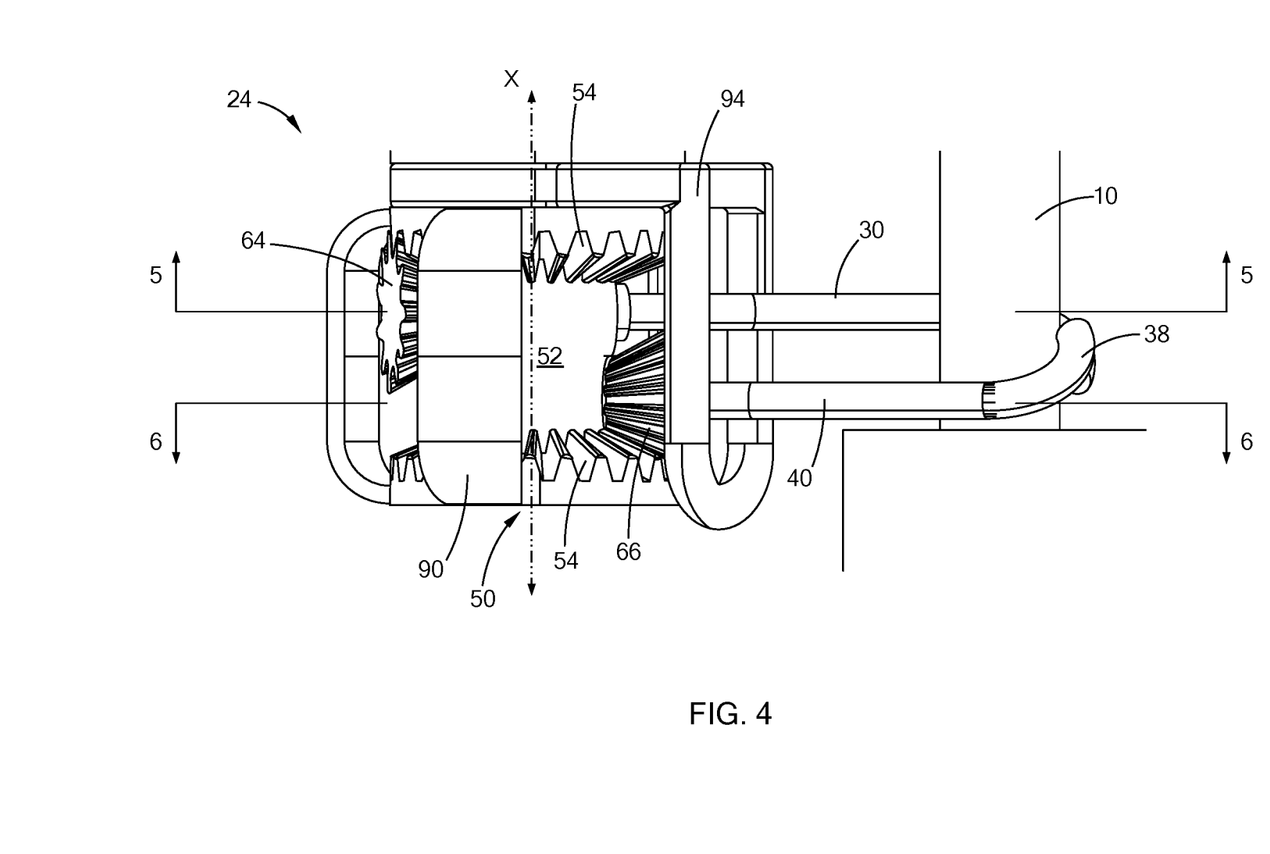
FIG. 4 is an enlarged front view of one grabber assembly of FIG. 3.
Figure 5:
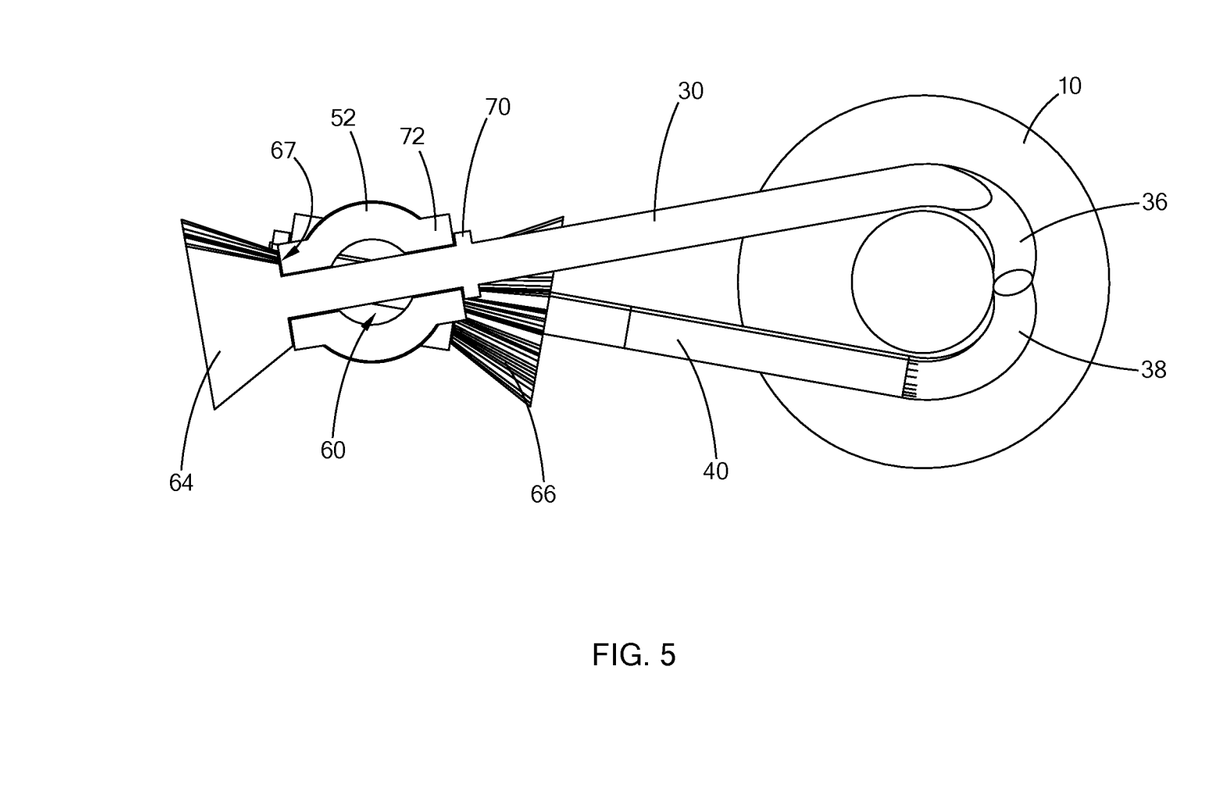
FIG. 5 is a cross-sectional view, taken along line 5-5 of FIG. 4 illustrating a first arm extending through a shaft of the grabber assembly.
Figure 6:
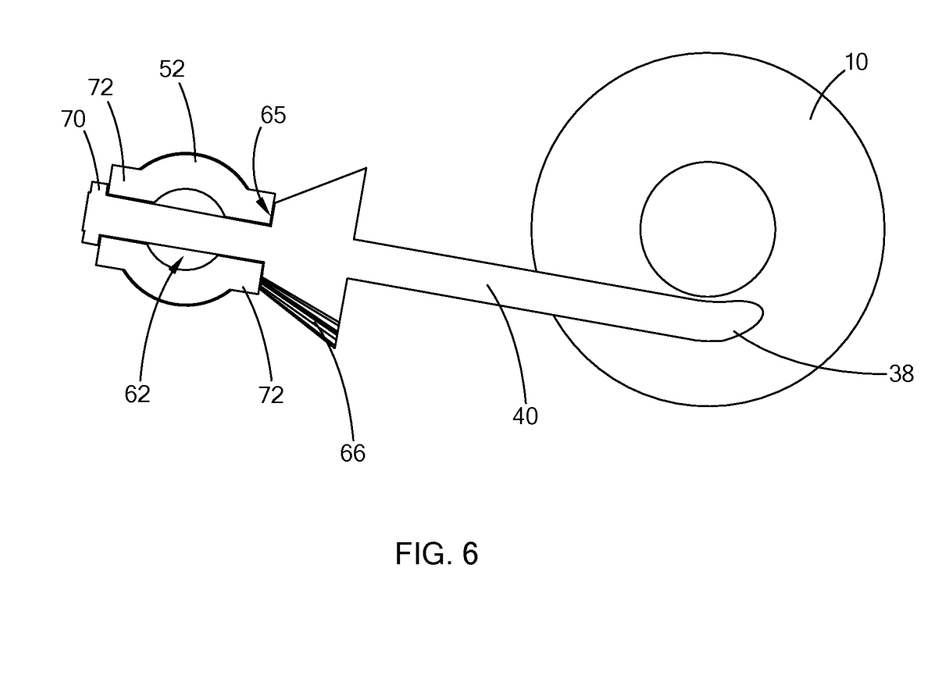
FIG. 6 is a cross-sectional view, taken along line 6-6 of FIG. 4 illustrating a second arm extending through a shaft of the grabber assembly.

Referring also to FIGS. 4-6, each grabber assembly 24 includes a hub assembly 50 comprising a shaft 52 rotationally coupled to opposed bevel gears 54. In one form, the opposed bevel gears 54 and the ends of the shaft 52 comprise races 56 (best shown in FIG. 3), which house bearings (not shown) to provide the rotational coupling around axis "X."

The shaft 52 further comprises a set of offset apertures 60 and 62. The first arm 30 extends through one of the offset apertures 60 of the shaft 52, and the second arm 40 extends through the other offset aperture 62. The first arm 30 further comprises a first bevel gear 64 disposed at the proximal end portion 32 and engaging one of the opposed bevel gears 54. Similarly, the second arm 40 further comprises a second bevel gear 66 disposed at the proximal end portion 42 and engaging the other opposed bevel gear 54.

In one form, each of the first arm 30 and the second arm 40 comprise a collar 70, each of which engages a boss 72 on each shaft 52 (best shown in FIGS. 4 and 5). As further shown, each of the first bevel gear 64 and the second bevel gear 66 comprise an end face 65/67, respectively, which also engage the bosses 72. Accordingly, the collars 70 and end faces 65/67 secure the first arm 30 and the second arm 40 to the shaft 52. A variety of assembly approaches and component configurations may be employed to facilitate this design. For example, the first bevel gear 64 and the second bevel gear 66 may be separate pieces that are secured in place after each of the first arm 30 and the second arm 40 are inserted through the offset apertures 60/62. Alternately, the shaft 52 may be a two-piece design (not shown), wherein each of the arms 30/40 are located in one half and the other half is subsequently secured around the arms 30/40 and the one half.

Referring back to FIG. 1 and also FIG. 3, the opposed bevel gears 54 are fixed in this form of the present disclosure. More specifically, the inner bevel gears 54 are secured to flanges 80 of a support frame 82 of the receiver 22. The receiver 22 in this form comprises a center ring 84 opposite the platform 26, which is rotationally mounted to the support frame 82. The support frame 82 and the center ring 84 each includes races 86, which house bearings (not shown) for the rotational movement around axis "Y" as shown.

As further shown, at least one shield 90 extends between the opposed bevel gears 54 and covers at least a portion of each opposed bevel gears 54. In this form, three (3) shields 90 are employed, which are integrally formed with the opposed bevel gears 54 as a single/unitized part. However, it should be understood that any number of shields may be employed, which may be separate parts or formed integrally with the opposed bevel gears 54 as illustrated herein, while remaining within the scope of the present disclosure.

The mechanical device 20 further comprises a stop to limit motion of the first and second arms 30/40. In this form, the stop comprises a cage 94 secured to the flanges 80 of the support frame 82 of the receiver 22. As shown, the cage 94 surrounds the first and second arms 30/40. More specifically, the cage 94 comprises a u-shaped bar that extends from one side of the cage 94 to the other. It should be understood that "surrounds" as used herein should be construed to mean completely surrounding as illustrated, or at least partially surrounding the first and second arms 30/40. As long as the cage 94 functions as a stop to limit motion of the first and second arms 30/40, then any form thereof should be construed as falling within the scope of the present disclosure. As further shown, the cage 94 is also secured to the flanges 80 of the support frame 82 of the receiver 22. More specifically, in this form, the opposed bevel gears 54 are secured to the cage 94, which is secured to the flange 80. In the design illustrated, these components are secured together with bolts (not shown). However, it should be understood that other means to secure these components together, or combining these individual components into fewer parts, should be construed as falling within the scope of the present disclosure.

Figure 7A:
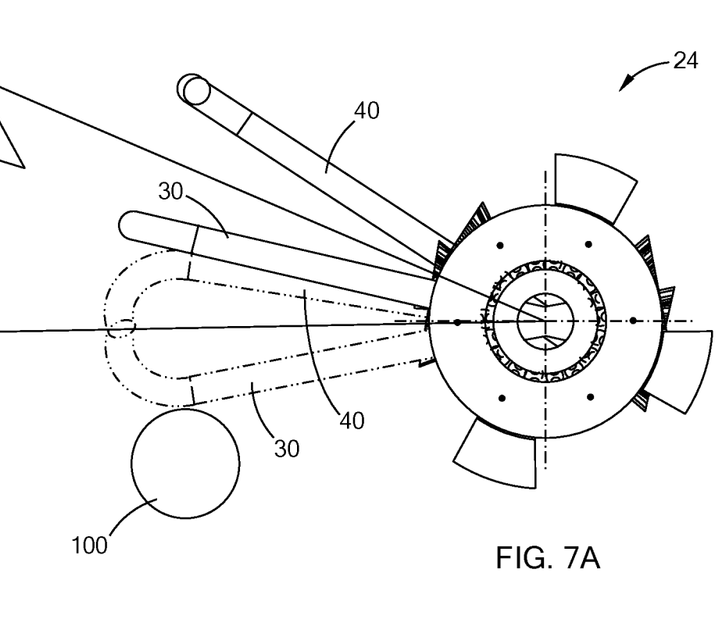
FIG. 7A is an end view of portions of the grabber assembly illustrating arms in both an open position and a closed position according to the teachings of the present disclosure.
Figure 7B:
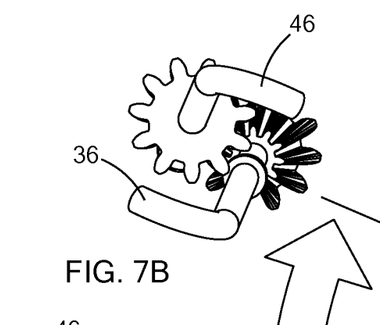
FIG. 7B is an end view of the arms of FIG. 8A in the open position.
Figure 7C:
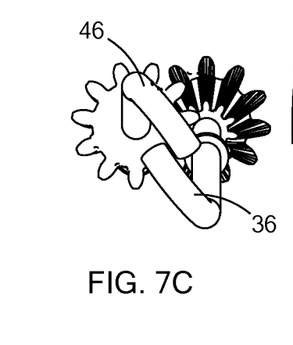
FIG. 7C is an end view of the arms of FIG. 8A in the closed position.
Figure 8:
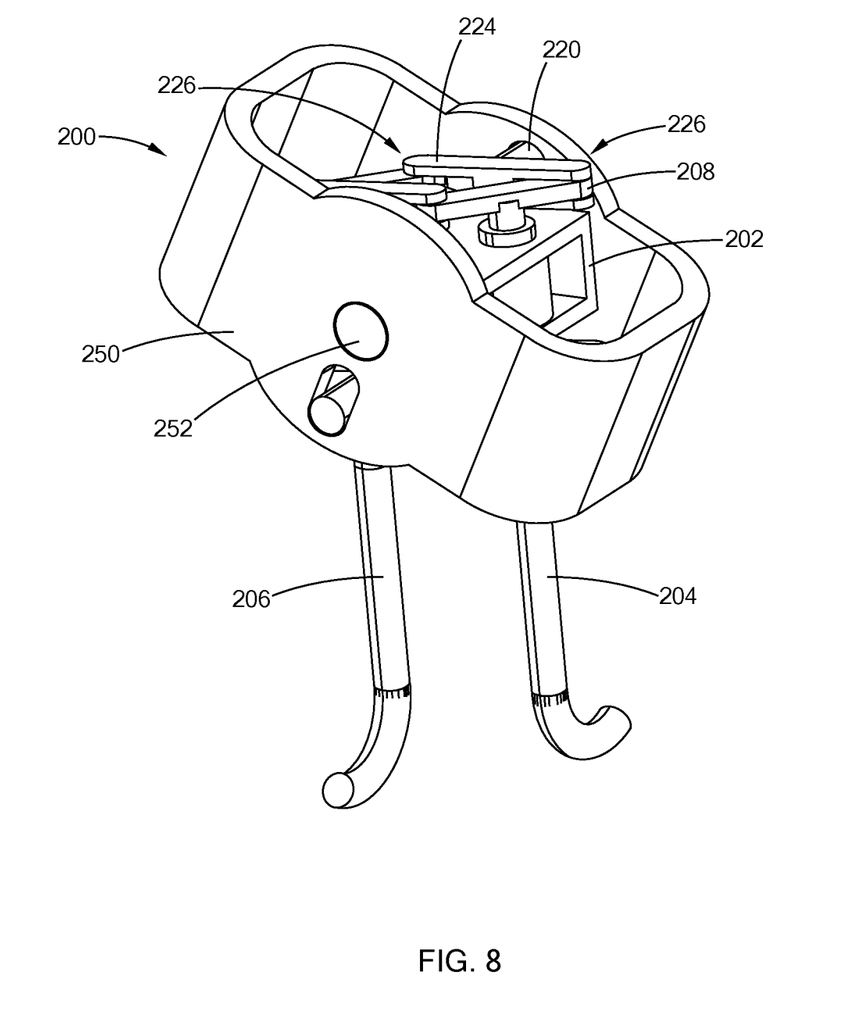
FIG. 8 is a top perspective view of another form of a mechanical device for grasping an object without a power source and constructed according to the teachings of the present disclosure.
Figure 9:
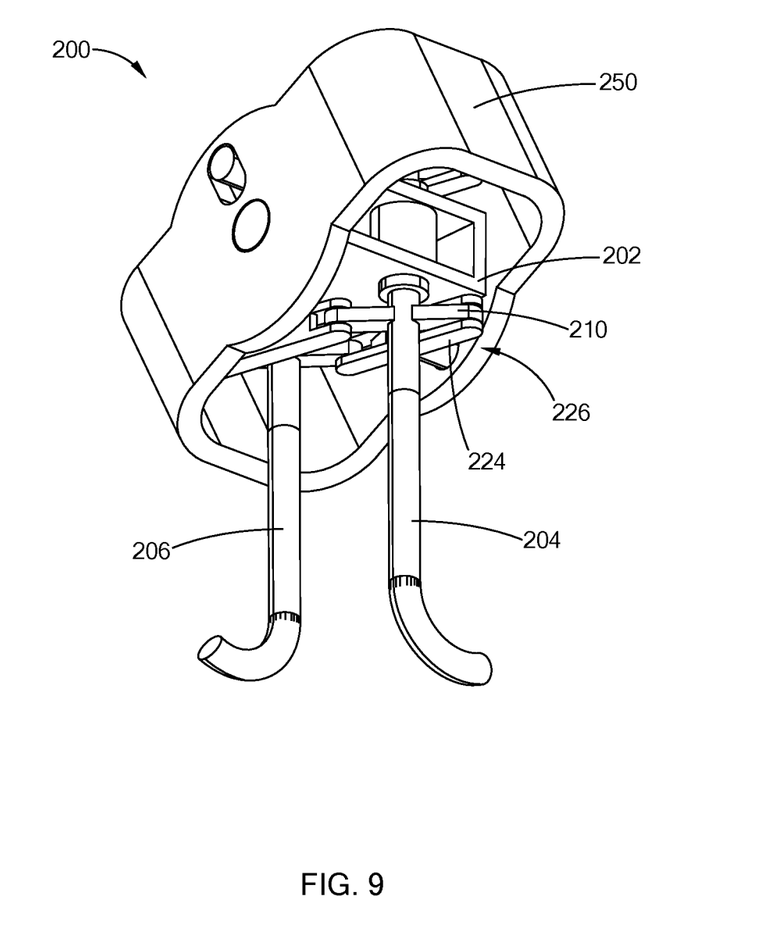
FIG. 9 is a bottom perspective view of the mechanical device of FIG. 8.
Figure 10:
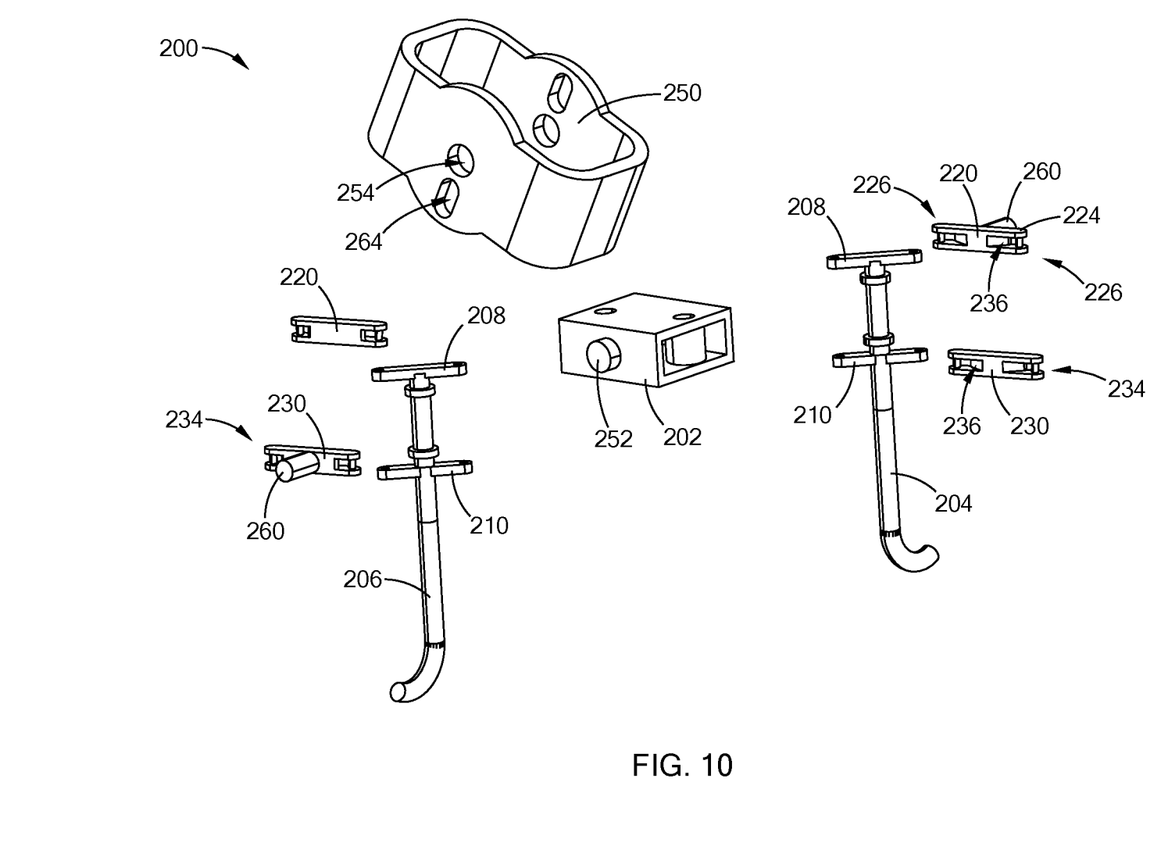
FIG. 10 is an exploded perspective view of the mechanical device of FIG. 8.
Figure 11A:
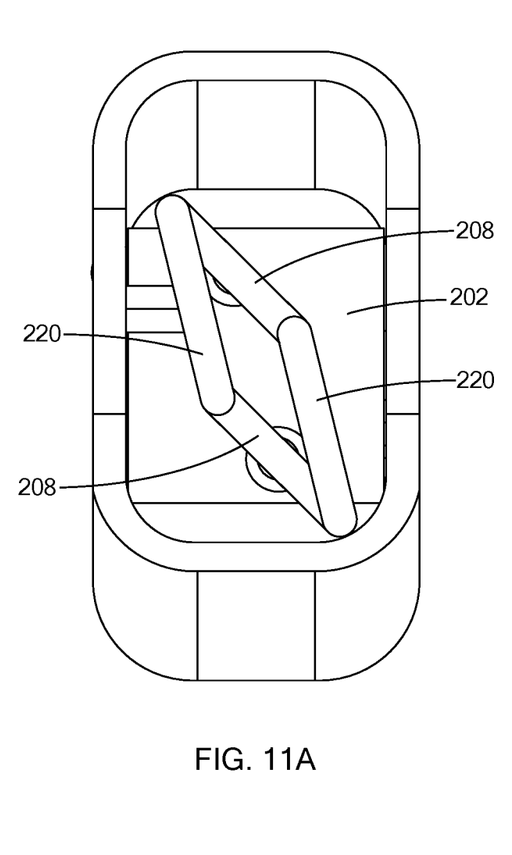
FIG. 11A is a top view of the mechanical device of FIG. 8.
Figure 11B:
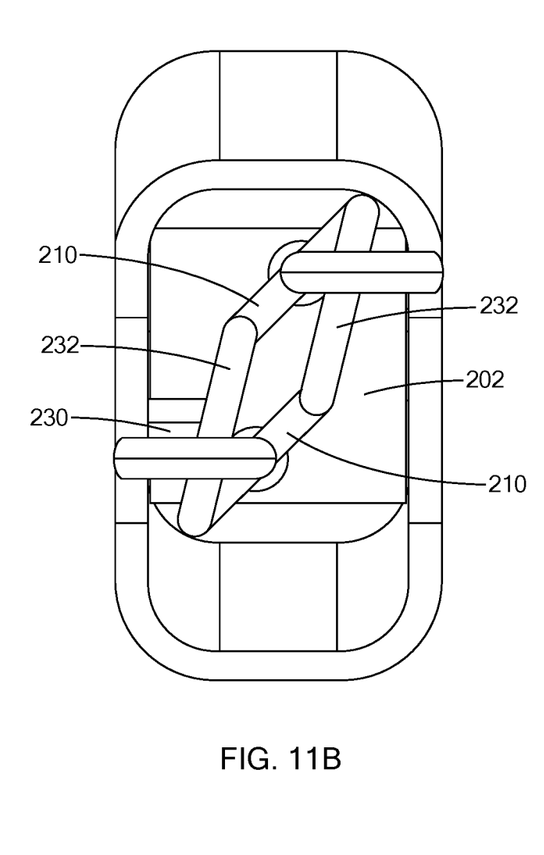
FIG. 11B is a bottom view of the mechanical device of FIG. 8.
Figure 12:
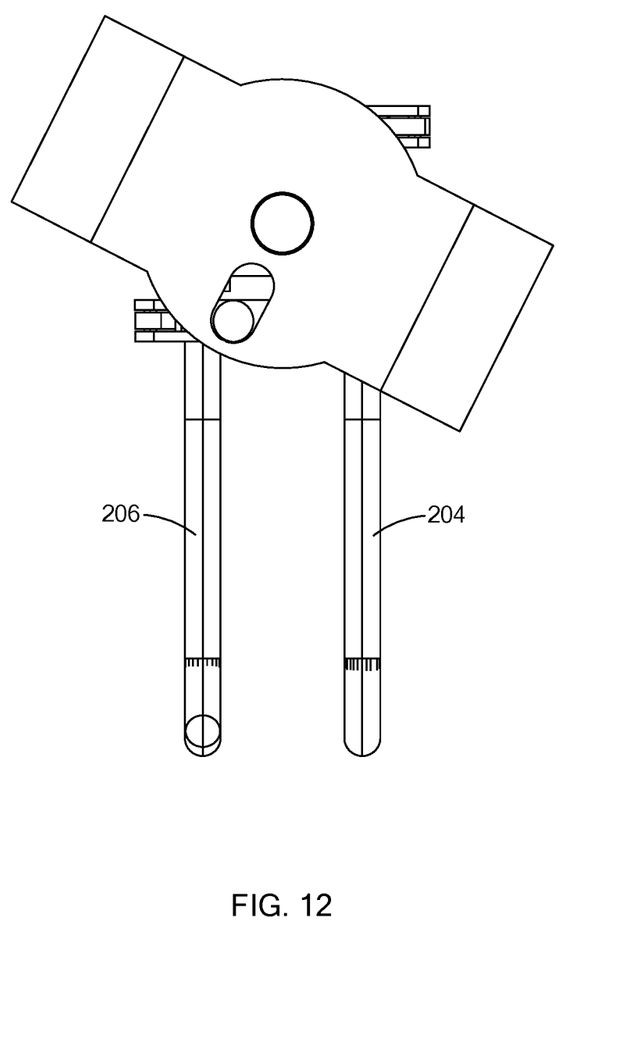
FIG. 12 is a side view of the mechanical device of FIG. 8.

Referring now to FIGS. 7A-7C in conjunction with FIG. 1, movement of the mechanical linkage, which in this form is a grabber assembly 24 with bevel gears, is illustrated in greater detail. When the first arm 30 or the second arm 40 is physically placed against a fixed object 100, (in this example the first arm 30), and the mechanical device 20 is moved or translated from the receiver 22, this causes movement of the mechanical linkage. More specifically, the first arm 30 rotates about the longitudinal axis "X" of the shaft via the rotational connection between the shaft 52 and the opposed bevel gears 54. As the first arm 30 rotates, the shaft 52 rotates, and thus the bevel gear 64 rotates and engages bevel gear 54. With rotation of the shaft 52, the second arm 40 also rotates, and its bevel gear 66 engages the opposed bevel gear 54. This rotation of the shaft 52, which is caused by forces from the first arm 30 being displaced against the fixed object 100, opens the arms 30/40 so that the hooks 36/46 can be placed around the fixed object 100. Then, the mechanical device 20 is translated into position such that the hooks 36/46 are around the fixed object 100, then the first arm 30 is placed against the fixed object again in an opposite direction to cause the first and second arms 30/40 to rotate in the opposite direction to close the hooks 36/46 around the fixed object 100. To release the fixed object 100, the first arm 30 (or the second arm 40) is displaced against the fixed object 100 to open the hooks 36/46. It should be understood that the first and second arms 30/40 may be displaced against any fixed object other than the fixed object 100 being grasped. Further, the fixed object need not be statically "fixed," and rather the fixed object should only be rigid enough to cause movement of one of the first or second arms 30/40 without the fixed object moving itself. Therefore, displacement of the first arm 30 or the second arm 40 against an object causes movement of the mechanical linkage (in this form the bevel gears) and thus movement of the second arm 40 or first arm 30, respectively.

Referring now to FIGS. 8-12, another form of a mechanical device according to the present disclosure is illustrated and generally indicated by reference numeral 200. In this form, the mechanical device 200 comprises a central frame 202, a first arm 204 and a second arm 206 extending through the central frame 202. Each of the first arm 204 and second arm 206 comprise upper links 208 and lower links 210. The mechanical device 200 further includes a pair of upper opposed receivers 220, each upper opposed receiver 220 comprising an arm 224 with end portions 226. Each end portion 226 is pivotally coupled to the upper links 208 of the first arm 204 and the second arm 206. A pair of lower opposed receivers 230 each similarly comprise an arm 232 with end portions 234. Each end portion 234 is pivotally coupled to the lower links 210 of the first arm 204 and the second arm 206, respectively. In one form, each of the upper opposed receivers 220 and the lower opposed receivers 230 comprise a slot 236 (best shown in FIG. 10). Each of the upper links 208 and the lower links 210 are disposed within a respective slot as shown so that their rotational movement can be accommodated.

Similar to the previous form of the present disclosure, the mechanical device 200 also includes a stop to limit motion of at least one of the first arm 204 and the second arm 206. More specifically, a cage 250 is secured to the central frame 202. In this form, the central frame 202 includes opposed tabs 252 that are disposed within apertures 254 of the cage 250.

As further shown, the upper receiver 220 and the lower receiver 230 in this form include pins 260, which are disposed within slots 264 of the cage 250. The slots 264 are provided to allow some vertical "play" of the first arm 204 and the second arm 206 during operation.

Accordingly, similar to the previously described form with bevel gears, displacement of the first arm 204 or the second arm 206 against an object causes rotation of the lower opposed receivers 230 and the upper opposed receivers 220 and thus movement of the second arm 206 or first arm 204, respectively. Similar features such as the hooks 36/46 as described above are not repeated with this variation for purposes of brevity.

Figure 13:
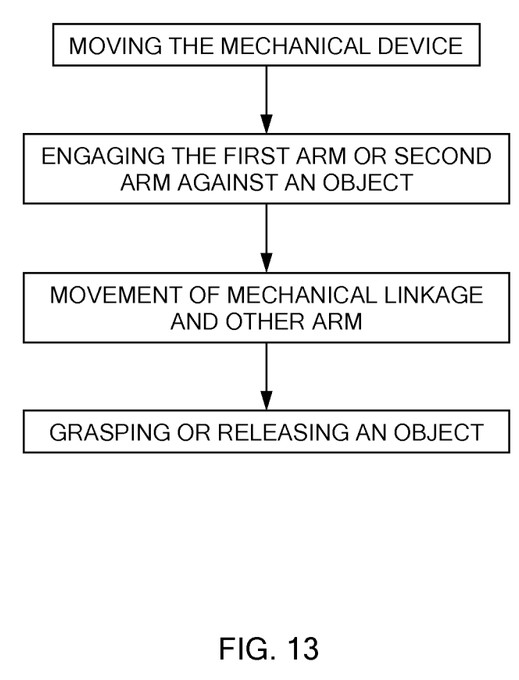
FIG. 13 is a flowchart depicting an algorithm for grasping an object in accordance with the teachings of the present disclosure.

Referring to FIG. 13, a method of grasping an object without a power source according to the present disclosure is illustrated. The method comprises moving the mechanical device as set forth herein and engaging the first arm or the second arm against an object. The object displaces the arm being engaged with the object, which causes movement of the mechanical linkage, which causes movement of the other arm. Accordingly, each of the arms may be moved against an object to open or close the arm, thereby grasping and releasing the object.

Advantageously, the mechanical linkage disposed near the proximal end portion of the first arm and the second arm kinematically couples the first arm and the second arm, wherein displacement of the first arm or the second arm against the object causes movement of the mechanical linkage, which causes movement of the second arm or first arm, respectively.

Grasping an object "without a power source" as used herein should be construed to mean grasping an object by only mechanical movement of the first and second arms as illustrated and described herein.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A mechanical device having no power source for grasping an object, the mechanical device comprising:
    a receiver; and
    at least one grabber assembly secured to the receiver, the at least one grabber assembly comprising:
        a first arm comprising a first proximal end portion and a first distal end portion, and a first hook disposed at the first distal end portion;
        a second arm comprising a second proximal end portion and a second distal end portion, and a second hook disposed at the second distal end portion; and
        a mechanical linkage disposed near the first proximal end portion of the first arm and the second proximal end portion of the second arm, the mechanical linkage kinematically coupling the first arm to the second arm,
    wherein displacement of the first arm or the second arm against the object causes movement of the mechanical linkage, and the movement of the mechanical linkage causes movement of the second arm or first arm, respectively.

2. The mechanical device according to claim 1, wherein the mechanical linkage comprises:
    a hub assembly comprising a shaft rotationally coupled to opposed bevel gears, the shaft comprising a set of offset apertures;
    the first arm extending through one of the offset apertures of the shaft, the first arm further comprising a first bevel gear disposed at the first proximal end portion and engaging one of the opposed bevel gears; and
    the second arm extending through another one of the offset apertures, the second arm further comprising a second bevel gear disposed at the second proximal end portion and engaging another one of the opposed bevel gears,
    wherein movement of the mechanical linkage comprises rotation of the shaft.

3. The mechanical device according to claim 2, wherein the opposed bevel gears are fixed.

4. The mechanical device according to claim 3 further comprising at least one shield extending between the opposed bevel gears, wherein the shield covers at least a portion of each opposed bevel gear.

5. The mechanical device according to claim 1, wherein each of the first and second hooks are integrally formed with each of the first and second arm.

6. The mechanical device according to claim 1, wherein each of the first and second hooks of the first and second arms extend in opposite directions.

7. The mechanical device according to claim 1, wherein each of the first and second hooks of the first and second arms extend in a same direction.

8. The mechanical device according to claim 1 further comprising a stop configured to limit motion of at least one of the first arm and the second arm.

9. The mechanical device according to claim 8, wherein the stop comprises a cage surrounding the first arm and the second arm.

10. The mechanical device according to claim 1, wherein the mechanical linkage comprises:
    a central frame, each of the first arm and second arm extending through the central frame, and each of the first arm and second arm comprising upper and lower links;
    a pair of upper opposed receivers, each upper opposed receiver comprising an arm with end portions, each end portion being pivotally coupled to the upper links of the first arm and the second arm; and
    a pair of lower opposed receivers, each lower opposed receiver comprising an arm with end portions, each end portion being pivotally coupled to the lower links of the first arm and the second arm,
    wherein the displacement of the first arm or the second arm against the object causes rotation of the lower opposed receivers and the upper opposed receivers, and the rotation of the lower opposed receivers and the upper opposed receivers causes movement of the second arm or first arm, respectively.

11. The mechanical device according to claim 10 further comprising a stop configured to limit motion of at least one of the first arm and the second arm.

12. The mechanical device according to claim 11, wherein the stop comprises a cage secured to the central frame.

13. The mechanical device according to claim 10, wherein each of the pair of upper opposed receivers and lower opposed receivers comprises a slot, each of the upper and lower links being disposed within a respective slot.

14. A mechanical device having no power source for grasping an object, the mechanical device comprising:
a receiver; and
opposed grabber assemblies secured to outboard portions of the receiver, each grabber assembly comprising:
a first arm comprising a first proximal end portion and a first distal end portion, and a first hook disposed at the first distal end portion;
a second arm comprising a second proximal end portion and a second distal end portion, and a second hook disposed at the second distal end portion; and
a mechanical linkage disposed near the first proximal end portion of the first arm and the second proximal end portion of the second arm, the mechanical linkage kinematically coupling the first arm and the second arm,
wherein displacement of the first arm or the second arm against the object causes movement of the mechanical linkage, and the movement of the mechanical linkage causes movement of the second arm or first arm, respectively.

15. The mechanical device according to claim 14, wherein the mechanical linkage comprises:
a hub assembly comprising a shaft rotationally coupled to opposed bevel gears, the shaft comprising a set of offset apertures;
the first arm extending through one of the offset apertures of the hub, the first arm further comprising a first bevel gear disposed at the first proximal end portion and engaging one of the opposed bevel gears; and
the second arm extending through another one of the offset apertures, the second arm further comprising a second bevel gear disposed at the second proximal end portion and engaging another one of the opposed bevel gears,
wherein movement of the mechanical linkage comprises rotation of the shaft.

16. The mechanical device according to claim 14, wherein each of the first and second hooks of the first and second arms extend in opposite directions.

17. The mechanical device according to claim 14, wherein each of the first and second hooks of the first and second arms extend in the same direction.

18. The mechanical device according to claim 14 further comprising a stop configured to limit motion of at least one of the first arm and the second arm.

19. The mechanical device according to claim 18, wherein the stop comprises a cage surrounding the first arm and the second arm.

20. A method of grasping an object, the method comprising:
moving a mechanical device having no power source, the mechanical device comprising:
a first arm comprising a first proximal end portion and a first distal end portion, and a first hook disposed at the first distal end portion;
a second arm comprising a second proximal end portion and a second distal end portion, and a second hook disposed at the second distal end portion; and
a mechanical linkage disposed near the first proximal end portion of the first arm and the second proximal end portion of the second arm, the mechanical linkage kinematically coupling the first arm and the second arm,
wherein moving the mechanical device comprises engaging one of the first arm and the second arm against the object, wherein the object displaces the one of the first arm and the second arm being engaged with the object, which causes movement of the mechanical linkage and the other of the first arm and the second arm.

* * * * *